Sept. 30, 1930. J. W. LEWIN 1,777,120
CONDUIT COUPLING
Filed April 16, 1928
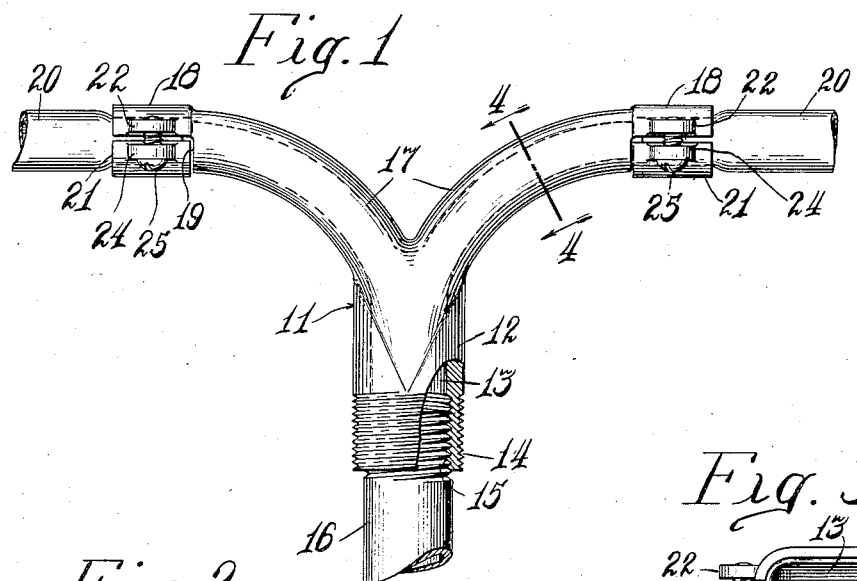
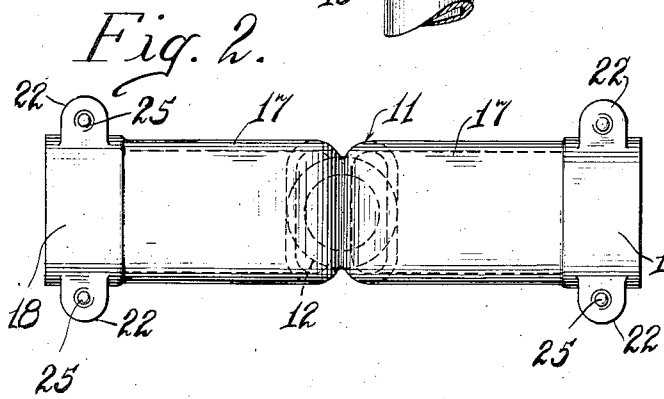
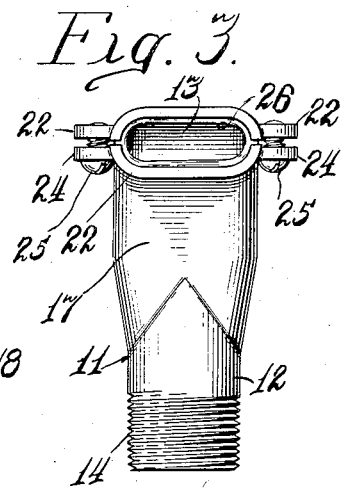
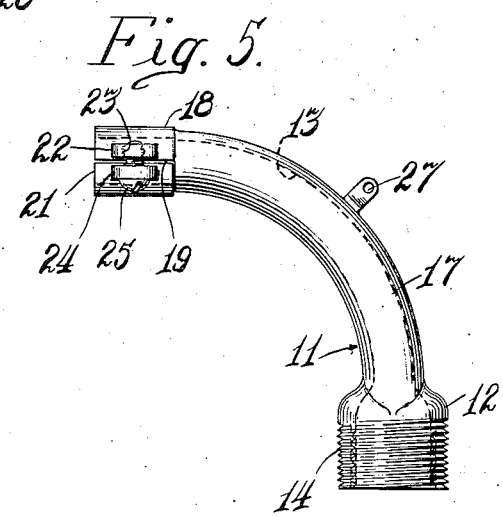
Inventor
Jacob W. Lewin
Daniel Brennan
Attorney Patented Sept. 30, 1930

1,777,120

UNITED STATES PATENT OFFICE

JACOB W. LEWIN, OF OAK PARK, ILLINOIS

CONDUIT COUPLING

Application filed April 16, 1928. Serial No. 270,342.

The invention pertains to improvements in conduit couplings and has particular reference to an adapter for oval duct for use where it is necessary to feed electric wires around corners in the walls of a building.

It is an object of the invention to provide an adapter for oval duct having a smooth interior surface to facilitate the feeding of electric wires therethrough.

Another object of this invention is to provide a curved adapter for oval duct which may be used in connection with conduit pipes of various sizes without necessitating the use of additional or special fittings.

Another object of the invention is attained in the provision of an adapter for oval duct having comparatively few parts, thereby reducing the time required to install same in a wiring system of a building.

Another object of the present invention resides in the provision of a curved adapter for oval duct having an arc whose radius is such that the said adapter requires but a minimum amount of space without offering resistance to electric wires when said wires are being fed therethrough.

Another object of the invention is to provide an adapter for oval duct having connecting means integral therewith, thereby preventing cement, plaster, or the like from entering the conduit and obstructing the passage of electric wires therethrough.

The invention, in general, comprises a curved conduit coupling, or adapter for oval duct, having a comparatively smooth interior surface and an easy arc to facilitate the feeding of electric wires through same. The conduit coupling is provided with attaching means integral therewith for making it adaptable to various sizes of conduit pipe without requiring the use of additional or special couplings or fittings. The improved conduit coupling, preferably being assembled at the time of manufacture, can be readily and quickly installed, and due to its simplicity of construction inexpensively manufactured.

From the foregoing, these and such other objects as will appear hereinafter as the description proceeds, will be more readily understood with reference to the accompanying drawings, in which;

Fig. 1 is a side elevational view of the improved curved adapter for oval duct having a conduit pipe threaded in one end thereof.

Fig. 2 is a plan view of the oval duct adapter shown in Fig. 1.

Fig. 3 is an end elevational view of the curved oval duct adapter.

Fig. 4 is a transverse sectional view through the curved extension of the adapter for oval duct, taken along line 4—4 of Fig. 1.

Fig. 5 is a side elevational view of an adapter for oval duct similar to that shown in Fig. 1, but of a modified form.

The adapter, as shown in the various figures of the drawing, consists of a body portion having means on one end adapted to have a threaded engagement with conduit piping of various sizes. The opposite end of the said body portion is provided with one or more extensions, said extensions being angularly disposed to the body portion and having means on their ends for receiving and clamping therein an oval shaped conduit or duct.

Referring now, to the form of the invention shown in Figs. 1 to 4, inclusive, the oval duct adapter or coupling 11 has a relatively short body portion 12 which is formed with a central opening or passage 13, and which is preferably cylindrical in shape. One end of this body portion is threaded externally and internally, as indicated respectively at 14 and 15.

The internal and external threads 14 and 15 adapt the coupling for use with conduit pipes of various sizes. Thus, a relatively large conduit pipe may be threaded onto the body portion, or a relatively small pipe may be threaded into the body. In Fig. 1 I have shown a conduit pipe 16 threaded into the body portion 12.

The opposite end of the body portion 12 terminates in a pair of oppositely disposed diverging extensions 17. These extensions are curved on a relatively small radius so as to reduce the general overall of the coupling, and they are substantially flattened into an oval shaped cross section, as shown in Fig. 4.

The coupling or T, formed in this manner, is adapted to be used when employing one conduit pipe for housing two independent lines, said lines branching off in opposite directions at a predetermined point, thereby eliminating the necessity of providing two separate conduits, both running in the same direction, as had been the practice previous to this invention.

The free ends of the extensions are adapted to be connected to suitable similarly shaped oval ducts for the branching lines. The free ends of the extensions 17 are struck outwardly to form offset portions 18 for receiving the ends of the ducts, thereby providing a smooth passage at the connection so that the lines may be easily threaded therethrough.

Suitable means are provided for clamping the ducts 20 in the free ends of the extensions. In the present instance, each offset portion 18 is cut away in part, preferably in the lower half, as indicated at 19, and a clamping member 21 is positioned therein to clamp the duct. The clamping member 21 preferably is in the form of a strap shaped to conform to one side of the duct 20.

To clamp the portions 18 and the members 21 against the opposite sides of the ducts so as to securely hold the latter in position, the portions 18 are provided at the cut margin with oppositely disposed ears or lugs 22 having suitable threaded apertures 23. The members 21 are also provided on their ends with similar ears or lugs 24 having suitable apertures and adapted to be positioned in alignment with the ears 22. Screws 25 are provided in the apertured ears 22 and 24, for securing the opposed clamping members together.

The interior surface of the improved adapter for oval ducts is free from any projections, the body portion merging into the extensions without any sudden offset. Where the offset ends 18 join the extensions 17 a shoulder 26 is provided. When the oval duct 20 is in place therein, the end of said duct abuts the shoulder 26. The inside dimensions of the duct being relatively the same as the inside measurements of the extension 17, a smooth joining is provided.

In Fig. 5 I have shown an adapter for oval duct similar to that shown in the previous figures, but having one curved extension. This type of adapter is commonly used as an elbow and is provided with an ear or lug 27 on its curved portion midway the ends. The lug 27 is utilized for securing the elbow in place during the installation of same.

It will readily be understood that, when using an article of this type to provide a conduit for electric wires, there are no obstacles present in the interior of the conduit to interfere with the free passage of the electric wires therethrough. The curvature of the extensions 17 are such that the electric wires easily and naturally move around the bend when being fed through the conduit.

By providing internal and external threads on the end of the body portion 12, the necessity of employing special fittings for the various sizes of conduit pipe now in general use is eliminated and the possibility of foreign matter entering the oval duct or the conduit is eliminated as the improved adapter is made of few parts and therefore presents no openings through which cement, plaster, or the like may enter.

Although I have illustrated and described the exemplary forms of construction, it is to be understood that they are capable of variations and modifications without departing from the spirit of the invention. I therefore, do not wish to be limited to the precise details set forth, but desire to avail myself of such variations and modifications as fall within the scope of the appended claims.

I claim:

1. An adapter for oval duct comprising a cylindrical body portion having internal and external threads on one end, and two oppositely curved extensions on the other end, said extensions being substantially oval shaped in cross-sectional area.

2. An adapter for oval duct comprising a cylindrical body portion having internal and external threads on one end and a plurality of substantially flat curved extensions on the other end, and a clamping means integral in part with the free end of each extension.

3. An adapter for oval duct comprising a cylindrical body portion having one end threaded, hollow extensions on the other end, said extensions being provided with offset portions on their outer ends, and a two part clamp associated with said offset portions for clamping an oval duct therein.

4. An adapter for oval duct comprising a cylindrical body portion having internal and external threads on one end, the other end of said body portion being reduced to form substantially flat hollow extensions, said extensions diverging from each other and having a two part clamp on their outer ends for clamping oval duct therein.

5. An adapter for oval duct comprising a cylindrical body portion having one end threaded and hollow extensions on the other end, clamping means comprising a rigid part formed integral with the end of said extensions for embracing one side of a duct, and a movable part for embracing the other side of the duct, and means for securing said parts together.

6. An adapter for oval duct comprising a cylindrical body portion having threads on one end and a reduced curved extension on the other end, an offset on the free end of the said extension providing a shoulder therein, a clamping member associated with said offset for embracing an oval duct and means associated with said offset and clamping members for securing the duct therein.

7. A curved adapter for oval duct comprising a cylindrical body portion having internal and external threads on one end, and a curved extension on the other end, said extension being substantially oval-shaped in cross sectional area and having means on its end for clamping oval duct therein.

8. An adapter for oval duct comprising, a cylindrical body portion having internal and external threads on one end and a plurality of reduced extensions on the other end for receiving oval duct; clamping means on the end of each extension, said clamping means comprising cooperating parts adapted to be drawn together to hold said duct in place.

9. An adapter for oval duct having an apertured lug formed integral therewith for retaining the adapter in place, comprising, a cylindrical body portion having internal and external threads on one end; a curved extension having an oval shaped cross-sectional area on the other end and clamping means on said extension for retaining oval duct therein.

In testimony whereof I affix my signature at 10 South La Salle Street, Chicago, Ill.

JACOB W. LEWIN.